United States Patent
Kim et al.

(10) Patent No.: US 9,947,468 B2
(45) Date of Patent: Apr. 17, 2018

(54) MULTILAYER CERAMIC ELECTRONIC COMPONENT AND MANUFACTURING METHOD THEREOF

(71) Applicant: SAMSUNG ELECTRO-MECHANICS CO., LTD., Suwon-si, Gyeonggi-do (KR)

(72) Inventors: Jin Seong Kim, Suwon-si (KR); Chang Hoon Kim, Suwon-si (KR); Doo Young Kim, Suwon-si (KR); Tae Young Kim, Suwon-si (KR); Seok Hyun Yoon, Suwon-si (KR); Jae Yeol Choi, Suwon-si (KR); Jae Sung Park, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 110 days.

(21) Appl. No.: 15/050,150

(22) Filed: Feb. 22, 2016

(65) Prior Publication Data
US 2017/0040111 A1 Feb. 9, 2017

(30) Foreign Application Priority Data
Aug. 7, 2015 (KR) .................. 10-2015-0111459

(51) Int. Cl.
*H01G 4/012* (2006.01)
*H01G 4/12* (2006.01)
(Continued)

(52) U.S. Cl.
CPC ............... *H01G 4/012* (2013.01); *H01G 4/12* (2013.01); *H01G 4/1227* (2013.01); *H01G 4/224* (2013.01); *H01G 4/30* (2013.01)

(58) Field of Classification Search
CPC .......... H01G 4/30; H01G 4/012; H01G 4/005; H01G 4/12; H01G 4/1227; H01G 4/248
See application file for complete search history.

(56) References Cited

U.S. PATENT DOCUMENTS

| | | | |
|---|---|---|---|
| 8,400,753 B2 * | 3/2013 | Kim | H01G 4/01 361/303 |
| 2009/0009927 A1 | 1/2009 | Iguchi et al. | |

(Continued)

FOREIGN PATENT DOCUMENTS

| | | |
|---|---|---|
| JP | 10-135063 A | 5/1998 |
| JP | 2010-080703 A | 4/2010 |

(Continued)

OTHER PUBLICATIONS

Notice of Office Action dated Jun. 9, 2016 issued in Korean Patent Application No. 10-2015-011459 (English translation).

*Primary Examiner* — Nguyen Ha
(74) *Attorney, Agent, or Firm* — McDermott Will & Emery LLP (57) ABSTRACT

A multilayer ceramic electronic component includes: a capacitor body including a plurality of dielectric layers and a plurality of internal electrodes; with external electrodes disposed on the capacitor body and electrically connected to the internal electrodes, wherein the capacitor body includes an active region in which internal electrodes having different polarities from each other overlap each other to form capacitance, and a margin part defined as region except for the active region. A concentration of an additive element in the margin part is higher than the concentration of the additive element in the active region, and the margin part has a concentration gradient of the additive element from a surface of the capacitor body toward the active region.

21 Claims, 4 Drawing Sheets

(51) Int. Cl.
  *H01G 4/224* (2006.01)
  *H01G 4/30* (2006.01)

(56) References Cited

U.S. PATENT DOCUMENTS

| | | |
|---|---|---|
| 2011/0056735 A1 | 3/2011 | Lee et al. |
| 2014/0036407 A1* | 2/2014 | Taniguchi ............ H01G 4/1218 361/301.4 |
| 2014/0185184 A1* | 7/2014 | Ahn ..................... H01G 4/30 361/301.4 |
| 2015/0016014 A1* | 1/2015 | Park ..................... H01G 2/065 361/301.4 |
| 2015/0049412 A1* | 2/2015 | Kim ..................... H01G 4/30 361/301.4 |
| 2015/0049413 A1* | 2/2015 | Wada .................... H01G 4/12 361/301.4 |
| 2016/0217924 A1* | 7/2016 | Morita ................ C04B 35/4682 |

FOREIGN PATENT DOCUMENTS

| | | |
|---|---|---|
| KR | 10-2009-0004651 A | 1/2009 |
| KR | 10-1069989 B1 | 10/2011 |

\* cited by examiner

MULTILAYER CERAMIC ELECTRONIC COMPONENT AND MANUFACTURING METHOD THEREOF

CROSS-REFERENCE TO RELATED APPLICATION

This application claims the benefit of priority to Korean Patent Application No. 10-2015-0111459, filed on Aug. 7, 2015 with the Korean Intellectual Property Office, the entirety of which is incorporated herein by reference.

TECHNICAL FIELD

The present disclosure relates to a multilayer ceramic electronic component and a manufacturing method thereof.

BACKGROUND

Electronic components using a ceramic material, such as capacitors, inductors, piezoelectric devices, varistors, thermistors, and the like, commonly include a capacitor body formed of the ceramic material, internal electrodes formed in the capacitor body, and external electrodes disposed on surfaces of the capacitor body to be connected to the internal electrodes.

Many fields requiring high reliability have become more digitalized in recent years. Demand for highly reliable products used in those fields has accordingly increased, and high levels of reliability are required for components in those products, such as multilayer ceramic electronic components.

Moisture resistance, withstand voltage characteristics, and the like, are factors that affect the reliability of the multilayer ceramic electronic component. A high degree of reliability may be difficult to realize when pores are present in a margin part of a capacitor body of the multilayer ceramic electronic component. In addition, the degree of densification of the capacitor body may affect the reliability of the multilayer ceramic electronic component.

SUMMARY

An exemplary embodiment in the present disclosure provides a multilayer ceramic electronic component and a manufacturing method thereof.

According to an exemplary embodiment in the present disclosure, a multilayer ceramic electronic component includes: a capacitor body including a plurality of dielectric layers and a plurality of internal electrodes with external electrodes disposed on the capacitor body and electrically connected to the internal electrodes, wherein a concentration of an additive element in the margin part of the capacitor body is higher than in an active region, and the margin part has a concentration gradient of the additive element from a surface of the capacitor body toward an active region, whereby the multilayer ceramic electronic component may have excellent reliability and moisture resistance. In addition, according to an exemplary embodiment in the present disclosure, there is provided a manufacturing method of the multilayer ceramic electronic component as described above.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

Multilayer Ceramic Electronic Component

Figure 1:
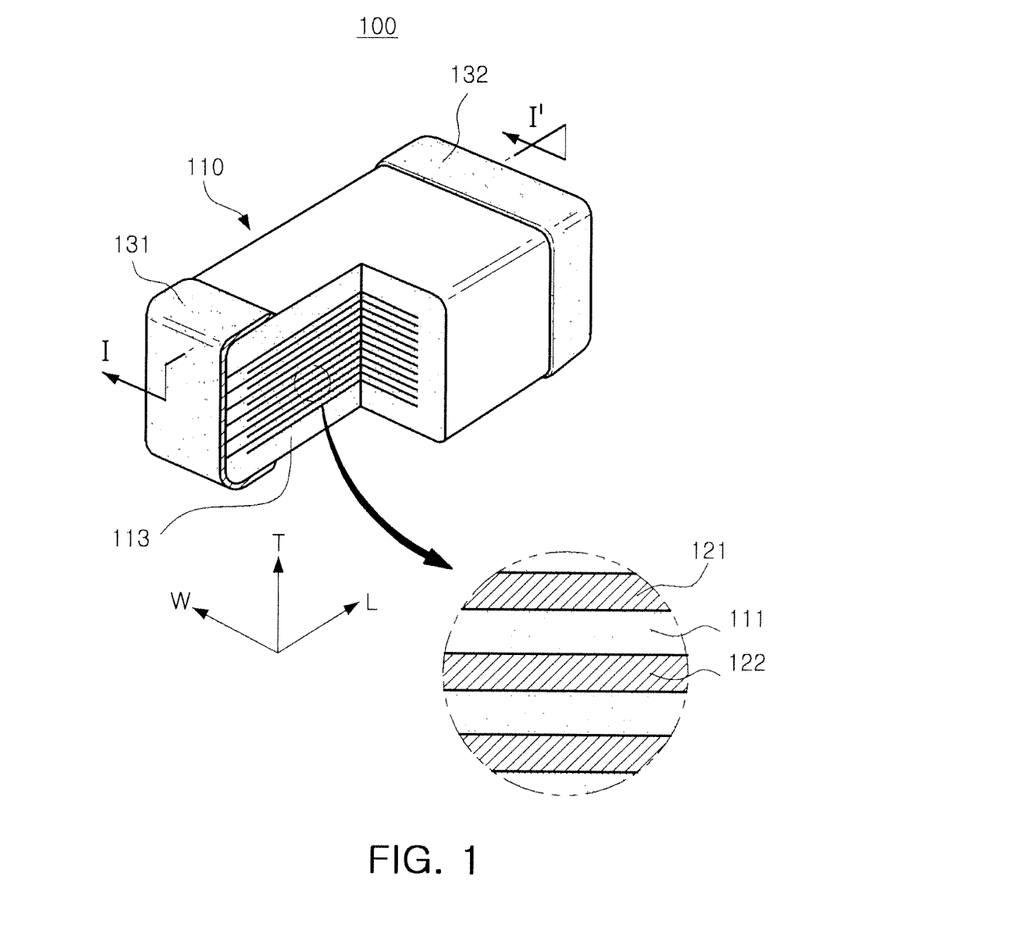
FIG. 1 is a partially cut-away perspective view schematically illustrating a multilayer ceramic electronic component according to an exemplary embodiment.
Figure 2:
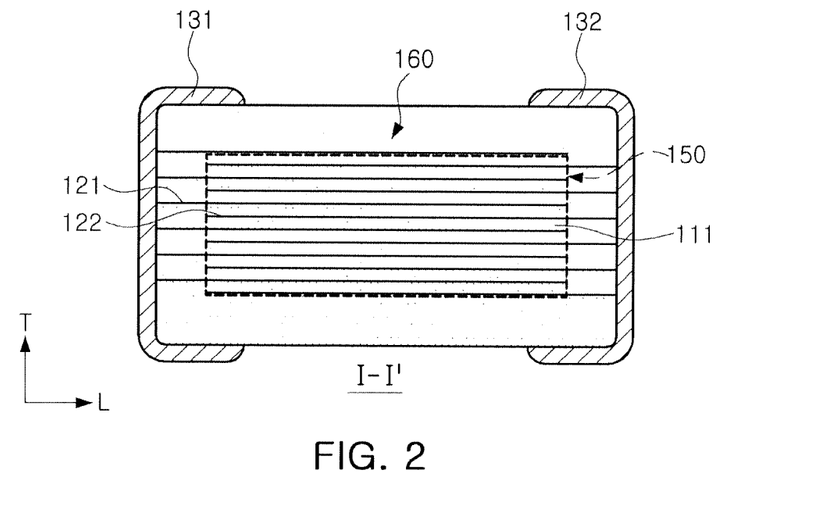
FIG. 2 is a cross-sectional view taken along line I-I' of FIG. 1.

FIG. 1 is a perspective view schematically illustrating a multilayer ceramic electronic component according to an exemplary embodiment in the present disclosure, and FIG. 2 is a cross-sectional view taken along line A-A' of FIG. 1.

Referring to FIG. 1, a multilayer ceramic electronic component 100 according to the exemplary embodiment may include a capacitor body 110; and external electrodes 131 and 132.

According to the exemplary embodiment, a T-direction illustrated in FIGS. 1 and 2 refers to a thickness direction, an L-direction illustrated in FIGS. 1 and 2 refers to a length direction, and a W-direction illustrated in FIGS. 1 and 2 refers to a width direction.

The thickness (T) direction refers to a stacking direction of internal electrodes and dielectric layers.

Referring to FIGS. 1 and 2, the capacitor body 110 may have upper and lower surfaces opposing each other in the thickness direction, first and second side surfaces opposing each other in the width direction, and first and second end surfaces opposing each other in the length direction. A shape of the capacitor body 110 is not particularly limited. For example, the capacitor body 110 may not have a perfect hexahedral shape but may have a substantially hexahedral shape.

The capacitor body 110 may include a plurality of dielectric layers 111 and internal electrodes 121 and 122.

The dielectric layer 111 may contain a ceramic composition having high permittivity. For example, the dielectric layer 111 may contain a barium titanate ($BaTiO_3$)-based dielectric material.

The barium titanate ($BaTiO_3$)-based dielectric material may be pure barium titanate or a compound in which other addition elements are doped in a Ba site (A site) and a Ti site (B site) of barium titanate.

The capacitor body 110 may include the internal electrodes 121 and 122 formed on the dielectric layers 111.

The internal electrodes 121 and 122 may contain a conductive metal, wherein the conductive metal may be nickel (Ni), but is not limited thereto.

Figure 3:
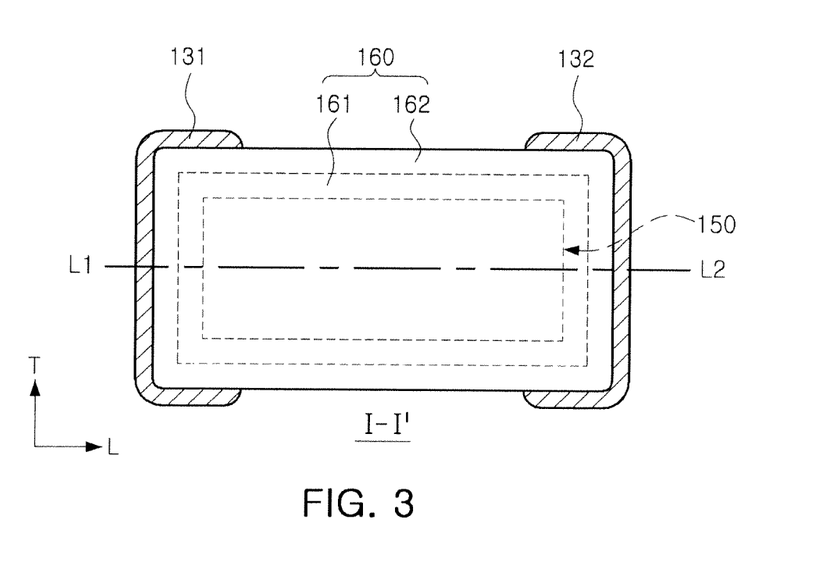
FIG. 3 is a cross-sectional view illustrating an active region and a margin part in a capacitor body of the multilayer ceramic electronic component according to the exemplary embodiment.

FIG. 3 is a cross-sectional view illustrating an active region 150 and a margin part 160 in a capacitor body 110 of the multilayer ceramic electronic component 100 according to the exemplary embodiment in the present disclosure.

As illustrated in FIG. 3, the capacitor body 110 may include an active region 150, which is a region in which the internal electrodes overlap each other to form capacitance, and a margin part 160 disposed on upper and lower surfaces of the active region, both surfaces thereof in the width direction, and both surfaces thereof in the length direction. The margin part 160 may be all regions of the capacitor body 110 except for the active region 150.

The margin part 160 may include a first region 161 adjacent to the active region and a second region 162 adjacent to surfaces of the capacitor body 110 based on a half of a distance between an outer surface of the active region 150 and the surface of the capacitor body 110.

Unless particularly described, upper and lower portions and the upper and lower surfaces are not separately distinguished in the capacitor body 110, but may be one portion and the other portion in the thickness direction and one surface and the other surface opposing each other in the thickness direction, respectively. In addition, the upper and lower surfaces may be first and second main surfaces of the capacitor body 110 opposing each other in the thickness direction, respectively.

The internal electrodes may include first and second internal electrodes 121 and 122. The first and second internal electrodes 121 and 122 may be alternately disposed on the dielectric layer with respective dielectric layers 111 interposed therebetween.

The first internal electrode 121 may be exposed to the first end surface of the capacitor body, and the second internal electrode 122 may be exposed to the second end surface of the capacitor body.

The external electrodes 131 and 132 may be disposed on the first and second end surfaces of the capacitor body to thereby be connected to the first and second internal electrodes 121 and 122. The external electrodes 131 and 132 may include the first external electrode 131 and the second external electrode 132, wherein the first external electrode 131 may be connected to the first internal electrode 121, and the second external electrode 132 may be connected to the second internal electrode 122.

The external electrodes may be formed by applying a conductive paste to the first and second end surfaces of the capacitor body and sintering the applied conductive paste, but a shape and a formation method of the external electrodes are not particularly limited.

The capacitor body 110 may be formed by sintering a green sheet multilayer body formed by stacking first ceramic green sheets on which an internal electrode paste is printed and second ceramic green sheets on which the internal electrode paste is not printed.

In this case, the second ceramic green sheets may constitute margin parts 160 disposed on the upper and lower surfaces of the active region after sintering, and the margin parts disposed on the upper and lower surfaces of the active region 150 may be defined as upper and lower cover layers, respectively.

Since the dielectric layers disposed in the active region 150 contribute to forming capacitance and the margin part 160 serves to protect the active region, different characteristics may be required in the dielectric layers disposed in the active region 150 and the margin part 160.

In this case, the characteristics required in the dielectric layers disposed in the active region 150 and the margin part 160 may be implemented by allowing the types and concentrations of additive elements contained in the dielectric layers disposed in the active region 150 and the margin part 160, respectively, to be different from each other.

Regarding the margin parts 160 disposed in the stacking direction of the dielectric layers and the internal electrodes, the concentration of additive elements may be different by using ceramic green sheets having a composition different from that of the ceramic green sheets for forming the dielectric layers disposed in the active region 150.

However, in general, ceramic green sheets forming margin parts 160 in directions perpendicular to the stacking direction of the dielectric layers 111 and the internal electrodes 121 and 122, for example, in the width direction and the length direction, are not distinguished from the ceramic green sheets forming the dielectric layers disposed in the active region 150.

In general, since the margin parts 160 in the directions perpendicular to the stacking direction of the dielectric layers 111 and the internal electrodes 121 and 122 are formed of the same ceramic green sheets as those of the dielectric layers constituting the active region 150, it is not easy to allow a concentration of the additive elements in the margin parts 160 to be different from that of the additive elements in the active region 150.

Further, margin parts 160 in a direction in which the internal electrodes 121 and 122 are not led, among the directions perpendicular to the stacking direction of the dielectric layers 111, and the internal electrodes 121 and 122 may be formed separately from the active region 150, such that the margin parts 160 may have a different concentration of the additive element from that of the active region 150. However, generally, in cases of the margin parts 160 in a direction in which the internal electrodes 121 and 122 are lead, it may be difficult to form the margin parts 160 separately from the active region 150, such that the concentration of the additive element in the margin part 160 may be equal to that of the additive element in the active region 150.

However, according to the exemplary embodiment in the present disclosure, since the margin parts 160 in the directions perpendicular to the stacking direction of the dielectric layers and the internal electrodes may also have a different concentration of the additive element from the active region 150, characteristics of the margin parts 160 may be improved.

According to the exemplary embodiment, an additive element coated on a surface at the time of forming the capacitor body may be diffused in the capacitor body 110, such that the concentration of the additive element in the margin part 160 may be higher than in the active region 150.

For example, when the stacking direction of the internal electrodes 121 and 122 and the dielectric layers 111 is defined as the thickness direction, a direction perpendicular to the thickness direction and in which ends of the internal electrodes are exposed to surfaces of the capacitor body is defined as the length direction, and a direction perpendicular to the thickness direction and the length direction is defined as the width direction, a concentration of the additive element in margin parts 160 of the capacitor body in the length direction and the width direction may be higher than in the active region 150, and the margin parts 160 of the capacitor body 110 in the length direction and the width direction have a concentration gradient of the additive element from the surface of the capacitor body toward an active region 150.

For example, the concentration of the additive element may be gradually decreased from the surface of the capacitor body 110 toward the active region 150.

The additive element may be one or more selected from Mg, Mn, Zr, Ti, Li, Mo, Nb, Cu, and rare earth elements, and in a case in which the margin part further contains one or more elements selected from Mg, Mn, Zr, Ti, Li, Mo, Nb, Cu, and the rare earth elements as the additive element, sintering of a dielectric material may be suppressed, such that a degree of densification of the margin part 160 may be improved.

Meanwhile, the margin part 160 may include the first region adjacent to the active region 161 and the second region adjacent to the surface of the capacitor body 162, based on half of the length measured in the direction from the outer surface of the active region 150 to the surface of the capacitor body 110, and degrees of densification of the first and second regions 161 and 162 may be different from each other.

According to the exemplary embodiment, a multilayer ceramic electronic component 100 having excellent moisture resistance may be provided by allowing the degree of densification of the first region 161 to be higher than that of the second region 162. The degree of densification of the margin part 160 may be adjusted depending on the concentration of the additive element, and in order to have a high degree of densification, the concentration of the additive element should be within a suitable range.

In this case, the additive element may be diffused so that the degree of densification of the first region 161 is higher than that of the second region 162.

Figure 4:
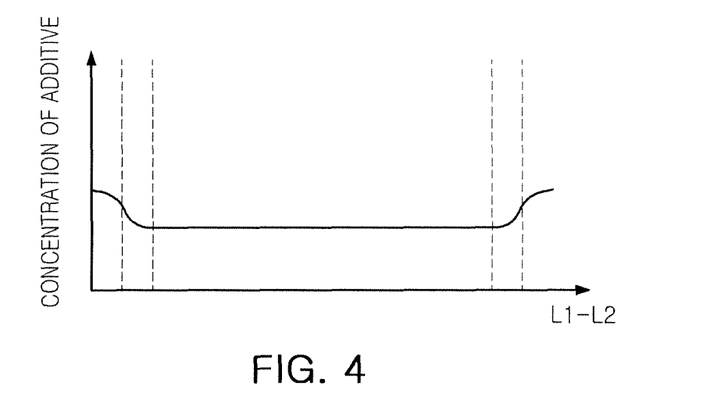
FIG. 4 is a virtual graph illustrating a concentration of an additive element depending on a Line L1-L2 of FIG. 3.

FIG. 4 is a virtual graph illustrating a concentration of an additive element depending on a Line L1-L2 of FIG. 3.

For example, in a case of diffusing a suitable concentration of the additive element in the first region 161 in order to allow the first region 161 to have a high degree of densification as illustrated in FIG. 4, the concentration of the additive element in the second region 162 may be increased as compared to the first region 161. In this case, the degree of densification of the second region 162 may be slightly decreased as compared to the first region 161 due to an excessive amount of the additive element, but moisture resistance of the multilayer ceramic electronic component 100 may be improved by increasing the degree of densification of the first region 161 adjacent to the active region 150.

According to the exemplary embodiment, the concentration of the additive element in the active region 150 may be 2.0 mol % or less, and the concentration of the additive element in the first region 161 of the margin part may be 0.01 mol % or more to 4.0 mol or less. In a case in which the concentration of the additive element in the first region 161 of the margin part is 0.01 mol % or more to 4.0 mol % or less, moisture resistance of the multilayer ceramic electronic component 100 may be effectively improved due to improvement of the degree of densification of the first region 161.

Meanwhile, the concentration of the additive element in the second region 162 of the margin part may be 0.2 mol % or more to 8.0 mol % or less.

Manufacturing Method of Multilayer Ceramic Electronic Component

Hereinafter, a manufacturing method of a multilayer ceramic electronic component according to another exemplary embodiment will be described, but the manufacturing method of a multilayer ceramic electronic component according to the exemplary embodiment is not necessarily limited thereto.

Figure 5:
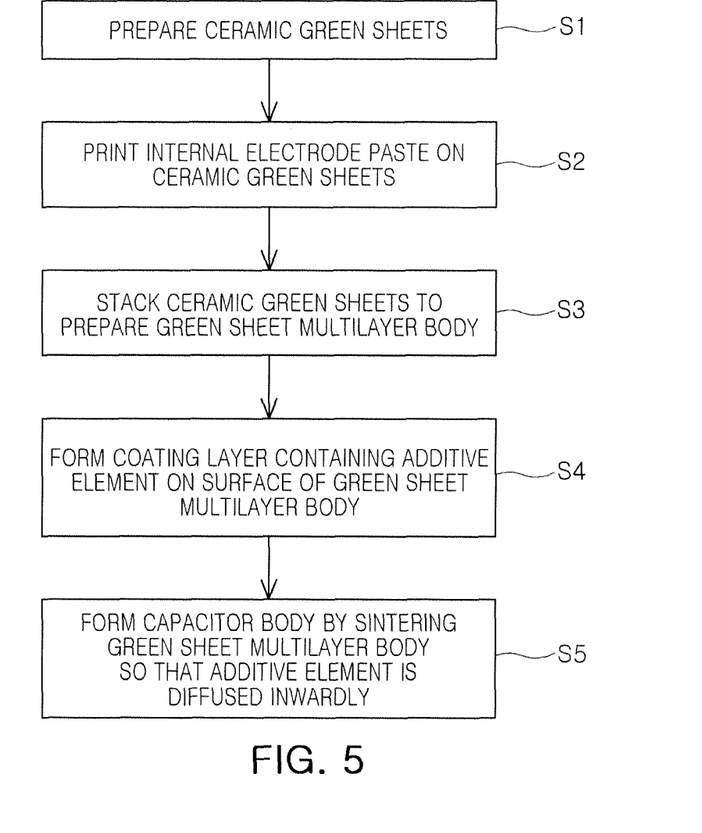
FIG. 5 is a flowchart illustrating a manufacturing method of a multilayer ceramic electronic component according to an exemplary embodiment.

FIG. 5 is a flow chart illustrating a manufacturing method of a multilayer ceramic electronic component according to another exemplary embodiment in the present disclosure.

The manufacturing method of a multilayer ceramic electronic component according to the present exemplary embodiment may include steps of: preparing a plurality of first ceramic green sheets and a plurality of second ceramic green sheets (S1); applying an internal electrode paste to the first ceramic green sheets (S2); stacking the first ceramic green sheets to which the internal electrode paste is applied and the second ceramic green sheets to prepare a green sheet multilayer body (S3); forming a coating layer containing an additive element on a surface of the green sheet multilayer body (S4); and forming a capacitor body by sintering the green sheet multilayer body so that the additive element is diffused inwardly (S5).

Among descriptions of the manufacturing method of a multilayer ceramic electronic component according to the present exemplary embodiment, description overlapping the descriptions of the multilayer ceramic electronic component according to the exemplary embodiment in the present disclosure described above will be omitted, and a difference therebetween will be mainly described below.

The first ceramic green sheets may be green sheets on which an internal electrode pattern is formed, and the second ceramic green sheets may be green sheets for forming upper and lower cover layers. Both of the first and second ceramic green sheets may be formed in plural.

The step of preparing the plurality of ceramic green sheets (S1) may be performed by applying a slurry containing dielectric powder to a carrier film and drying the applied slurry.

The step of applying an internal electrode paste to the first ceramic green sheets (S2) may be performed by printing the internal electrode paste on the ceramic green sheets, but a formation method of the internal electrode pattern is not limited thereto.

The step of preparing the green sheet multilayer body (S3) may be performed by stacking the first ceramic green sheets on which an internal electrode pattern is formed and the second greens sheets on which the internal electrode pattern is not formed.

The second ceramic green sheets may be stacked to be disposed on and below a region in which the first ceramic green sheets are stacked.

Next, the forming of the coating layer containing the additive element on the surface of the green sheet multilayer body (S4) may be performed by dipping the green sheet multilayer body in a solution for forming the coating layer or using a deposition method such as a physical vapor deposition (PVD) method, a chemical vapor deposition (CVD) method, or the like, but is not particularly limited.

Thereafter, the capacitor body may be formed by sintering the green sheet multilayer body so that the additive element is diffused inwardly.

Next, the step of forming the capacitor body (S5) may be performed by sintering the green sheet multilayer body.

An amount of an additive element diffused in a margin part may be controlled by adjusting a thickness and concentration of the coating layer of the additive element formed on the surface the green sheet multilayer body and a sintering temperature of the green sheet multilayer body.

The manufacturing method of a multilayer ceramic electronic component may further include, before the sintering, a step of pressing the green sheet multilayer body and cutting the pressed green sheet multilayer body into individual electronic components so that ends of internal electrode patterns are alternately exposed to cutting surfaces.

Then, external electrodes may be formed by applying an external electrode paste to an outer surface of the ceramic body and sintering the applied external electrode paste. Application of the external electrode paste may be performed by dipping the capacitor body in the external electrode paste, but is not limited thereto.

Experimental Example

Figure 6A:
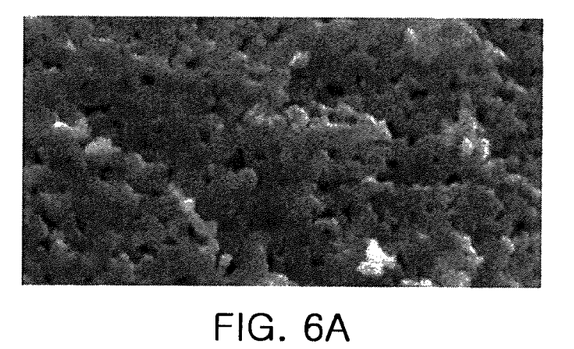
FIGS. 6A through 6C are scanning electron microscope (SEM) photographs illustrating cross sections of capacitor bodies according to Experimental Examples.
Figure 6B:
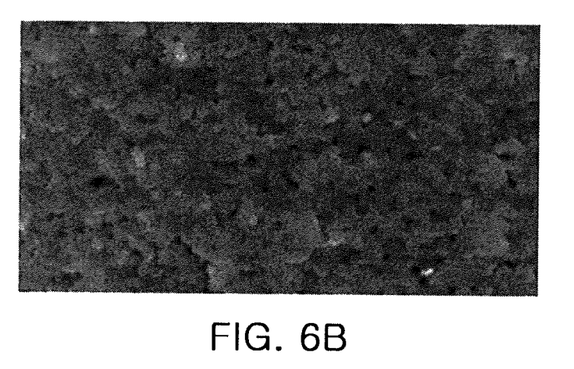
Figure 6C:
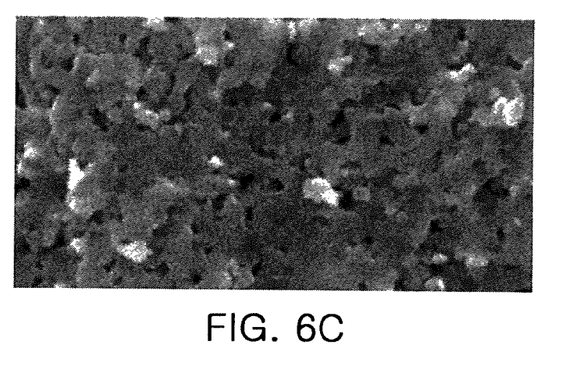

FIGS. 6A through 6C are scanning electron microscope (SEM) photographs illustrating micro structures depending on whether or not an additive element is diffused and a diffusion concentration of the additive element. In the present Experimental Example, magnesium (Mg) was used as the additive element.

A multilayer ceramic electronic component used in the present Experimental Example was manufactured as follows.

Slurry containing barium titanate ($BaTiO_3$) powder was applied to and dried on a carrier film, thereby preparing a plurality of ceramic green sheets.

Then, an internal electrode pattern was formed by applying a conductive paste for an internal electrode containing nickel on some of the ceramic green sheets.

Next, the ceramic green sheets on which the internal electrode pattern was printed and the ceramic green sheets (for upper and lower cover layers) on which the internal electrode pattern was not printed were stacked and isostatically pressed. A ceramic multilayer body subjected to the pressing was cut into individual electronic components so that ends of the internal electrode patterns were alternately exposed to cut surfaces, thereby preparing a plurality of green sheet multilayer electronic components.

A magnesium additive element solution was prepared by stirring $MgCO_3$ powder, a dispersant, and ethanol.

Next, the magnesium additive element solution was coated on the green sheet multilayer electronic component by dipping the green sheet multilayer electronic component in the prepared magnesium additive element solution.

For comparison, one green sheet multilayer electronic component was not coated with the magnesium additive element solution.

Then, de-binding was performed.

Thereafter, a capacitor body was formed by sintering the green sheet multilayer electronic component under reduction atmosphere having oxygen partial pressure lower than Ni/NiO equilibrium oxygen partial pressure so that the internal electrodes were not oxidized.

Then, a paste containing copper powder and glass frit was applied to an outer surface of the capacitor body to which the internal electrodes were exposed, and the applied paste was sintered, thereby forming external electrodes.

FIG. 6A is a scanning electron microscope (SEM) photograph illustrating a cross section of the green sheet multilayer electronic component on which the coating layer was not formed after the sintering. FIG. 6B is a scanning electron microscope (SEM) photograph illustrating a region in which a magnesium element was diffused at a concentration of about 0.1 mol %. FIG. 6C is a scanning electron microscope (SEM) photograph illustrating a region in which the magnesium element was diffused at a concentration of about 0.3 mol %.

As shown in FIGS. 6A through 6C, in the case of FIG. 6B, in which the magnesium element was diffused at a concentration of 0.1 mol %, the degree of densification was the highest. In the case of FIG. 6C, in which the amount of magnesium element was excessively contained, the degree of densification was lower than in the case of FIG. 6A, in which the magnesium element was not diffused.

Therefore, it may be confirmed that the degree of densification may be controlled by diffusion after coating the additive element on the surface, and moisture resistance and reliability of the multilayer ceramic electronic component may be improved by increasing the degree of densification of a region adjacent to an active region.

As set forth above, according to exemplary embodiments in the present disclosure, the multilayer ceramic electronic component having excellent moisture resistance and reliability, and the manufacturing method thereof may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a capacitor body including a plurality of dielectric layers and a plurality of internal electrodes; and
external electrodes disposed on the capacitor body and electrically connected to the internal electrodes,
wherein the capacitor body includes an active region in which internal electrodes having different polarities from each other overlap each other to form capacitance, and a margin part defined as a region of the capacitor body except for the active region,
a concentration of an additive element in the margin part being higher than in the active region, and in the margin part, the concentration of the additive element gradually decreases from a surface of the capacitor body toward the active region,
wherein a stacking direction of the internal electrodes and the dielectric layers is a thickness direction, a direction perpendicular to the thickness direction and in which ends of the internal electrodes are exposed to the surfaces of the capacitor body is a length direction, and a direction perpendicular to the thickness direction and the length direction is a width direction,
wherein a concentration of the additive element in margin parts of the capacitor body in the length direction is higher than in the active region.

2. The multilayer ceramic electronic component of claim 1, wherein
the margin parts of the capacitor body in the length direction have a concentration gradient of the additive element from the surface of the capacitor body toward the active region.

3. The multilayer ceramic electronic component of claim 1, wherein
a concentration of the additive element in margin parts of the capacitor body in the width direction is higher than in the active region, and the margin parts of the capacitor body in the width direction have a concentration gradient of the additive element from the surface of the capacitor body toward the active region.

4. The multilayer ceramic electronic component of claim 1, wherein the margin part includes a first region adjacent to the active region and a second region adjacent to the surface of the capacitor body, based on a half of a distance between an outer surface of the active region and the surface of the capacitor body, and
degrees of densification of the first and second regions are different from each other.

5. The multilayer ceramic electronic component of claim 4, wherein the degree of densification of the first region is higher than that of the second region.

6. The multilayer ceramic electronic component of claim 4, wherein a concentration of the additive element in the second region is higher than a concentration of the additive element in the first region.

7. The multilayer ceramic electronic component of claim 4, wherein a concentration of the additive element in the first region is 0.01 mol % or more to 4.0 mol % or less.

8. The multilayer ceramic electronic component of claim 4, wherein a concentration of the additive element in the second region is 0.2 mol % or more to 8.0 mol % or less.

9. The multilayer ceramic electronic component of claim 1, wherein the concentration of the additive element gradually decreases from the surface of the capacitor body toward the active region.

10. The multilayer ceramic electronic component of claim 1, wherein the additive element includes one or more selected from Mg, Mn, Zr, Ti, Li, Mo, Nb, Cu, and rare earth elements.

11. The multilayer ceramic electronic component of claim 1, wherein a concentration of the additive element in the active region is 2.0 mol % or less.

12. A manufacturing method of a multilayer ceramic electronic component, the manufacturing method comprising steps of:
preparing a plurality of first ceramic green sheets and a plurality of second ceramic green sheets;
applying an internal electrode paste on the first ceramic green sheets;
stacking the first ceramic green sheets and the second ceramic green sheets to prepare a green sheet multilayer body;
forming a coating layer containing an additive element on a surface of the green sheet multilayer body; and
forming a capacitor body including an active region corresponding to a region in which internal electrodes having different polarities from each other overlap each other to form capacitance, and a margin part corresponding to a region except for the active region by sintering the green sheet multilayer body so that the additive element is diffused inwardly,
wherein a concentration of the additive element in the margin part is higher than that in the active region, and in the margin part the concentration of the additive element gradually decreases from a surface of the capacitor body toward the active region,
wherein a stacking direction of the internal electrodes and the dielectric layers is a thickness direction, a direction perpendicular to the thickness direction and in which ends of the internal electrodes are exposed to the surfaces of the capacitor body is a length direction, and a direction perpendicular to the thickness direction and the length direction is a width direction,
wherein a concentration of the additive element in margin parts of the capacitor body in the length direction is higher than in the active region.

13. The manufacturing method of claim 12, wherein the margin part includes a first region adjacent to the active region and a second region adjacent to the surface of the capacitor body, based on a half of a distance between an outer surface of the active region and the surface of the capacitor body, and degrees of densification of the first and second regions are different from each other.

14. The manufacturing method of claim 13, wherein a concentration of the additive element in the second region is higher than in the first region.

15. The manufacturing method of claim 13, wherein the degree of densification of the first region is higher than that of the second region.

16. The manufacturing method of claim 12, wherein the additive element includes one or more selected from Mg, Mn, Zr, Ti, Li, Mo, Nb, Cu, and rare earth elements.

17. The manufacturing method of claim 12, wherein the margin part has the concentration gradient of the additive element due to diffusion of the additive element coated on the surface of the capacitor body.

18. A multilayer ceramic electronic component comprising:

a capacitor body including a plurality of dielectric layers and a plurality of internal electrodes; and external electrodes disposed on the capacitor body and electrically connected to the internal electrodes, wherein the capacitor body includes an active region in which internal electrodes having different polarities from each other overlap each other to form capacitance, and a margin part defined as a region of the capacitor body except for the active region, the margin part includes a first region adjacent to the active region and a second region adjacent to a surface of the capacitor body, and a concentration of an additive element is higher in the second region than a concentration of the additive element in the first region, and the concentration of the additive element is higher in the first region than a concentration of the additive element in the active region, wherein a stacking direction of the internal electrodes and the dielectric layers is a thickness direction, a direction perpendicular to the thickness direction and in which ends of the internal electrodes are exposed to the surfaces of the capacitor body is a length direction, and a direction perpendicular to the thickness direction and the length direction is a width direction, a concentration of the additive element in margin parts of the capacitor body in the width direction is higher than in the active region.

19. The multilayer ceramic electronic component of claim 18, wherein the concentration of the additive element in the first region is 0.01 mol % or more to 4.0 mol % or less.

20. The multilayer ceramic electronic component of claim 18, wherein the concentration of the additive element in the second region is 0.2 mol % or more to 8.0 mol % or less.

21. The multilayer ceramic electronic component of claim 18, wherein the concentration of the additive element in the active region is 2.0 mol % or less.

* * * * *